United States Patent [19]

Hayami

[11] Patent Number: 5,470,657
[45] Date of Patent: Nov. 28, 1995

[54] HEAT-RESISTANT, HIGH-VOLTAGE LEAD WIRE FOR DIRECT CURRENT

[75] Inventor: Hiroshi Hayami, Osaka, Japan

[73] Assignee: Sumitomo Electric Industries, Ltd., Osaka, Japan

[21] Appl. No.: 281,531

[22] Filed: Jul. 28, 1994

Related U.S. Application Data

[63] Continuation of Ser. No. 930,597, Oct. 2, 1992, abandoned.

[30] Foreign Application Priority Data

Apr. 26, 1991 [JP] Japan ..................... 3-125376

[51] Int. Cl.⁶ .................................................. B32B 9/00
[52] U.S. Cl. ..................... 428/373; 428/461; 428/457; 428/462; 428/458; 428/382; 428/380; 174/110 SR; 174/110 PM; 174/110 V
[58] Field of Search ..................... 428/457, 382, 428/461, 380, 462, 378, 515, 373, 458; 521/92; 524/433; 174/110 PM, 110 SR, 110 V

[56] References Cited

U.S. PATENT DOCUMENTS

| | | | |
|---|---|---|---|
| 3,971,884 | 7/1976 | Meeks et al. | 428/391 |
| 4,446,254 | 5/1984 | Nakae et al. | 524/92 |
| 5,057,367 | 10/1991 | Morri et al. | 428/389 |
| 5,063,114 | 11/1991 | Nambu et al. | 428/389 |
| 5,221,781 | 6/1993 | Aida et al. | 524/433 |

*Primary Examiner*—Patrick J. Ryan
*Assistant Examiner*—Patrick R. Jewik
*Attorney, Agent, or Firm*—Wenderoth, Lind & Ponack

[57] ABSTRACT

Disclosed is a heat-resistant, high-voltage insulated lead wire for direct current, which meets the demand for higher heat resistance, and its insulating coating over the conductor is formed by a polyolefin resin composition. The polyolefin resin composition is a flame-retarded resin composition comprising of a mixture of a polyethylene whose crystalline component has melting point higher than 125° C. and a copolymer of ethylene and α-olefin, which contains a multifunctionalized monomer having unsaturated carbon-carbon bond moiety in the molecule as an indispensable component. The insulating coating made of this resin composition is irradiated by an ionizing radiation to give a heat-resistant, high-voltage lead wire for direct current, which has a perpendicular flame resistance (VW-1) acceptable in the UL Standards and has a temperature rating of higher than 125° C.

3 Claims, 1 Drawing Sheet

HEAT-RESISTANT, HIGH-VOLTAGE LEAD WIRE FOR DIRECT CURRENT

This application is a continuation of now abandoned application, Ser. No. 07/930,597, filed Oct. 2, 1992, which is the U.S. national stage of PCT/JP92/00535, filed Apr. 24, 1992.

FIELD OF THE INVENTION

The present invention relates to heat-resistant, high-voltage lead wires for direct current, which have performances covering the UL Standards at higher than 125° C. of temperature ratings and are to be utilized, for example, for wiring in televisions, electromagnetic cookers, copying machines, computers and other electronic appliances.

Background of the Invention

It is important for the insulated wires used in televisions, electromagnetic cookers, copying machines, computers and other electronic appliances to be safe against fire, and such fire-resistant, insulated wires as authorized by the Electric Appliances Regulations in Japan, the UL Standards in the United States and the CSA Standards in Canada are used for the purpose.

In addition, since the fire-resistant, insulated wires used in the high-voltage parts of electronic appliances deal direct current of so high a voltage of 10 to 40 kV, safety against high voltage is also important.

As the method of evaluation of high-voltage wires for electronic appliances, one described in the Subject 758 in the UL Standards are known. In the evaluating method described there, (1) the high-voltage cut-through test and (2) the fire-resistance test are regarded to be technically difficult to pass.

FIG. 2 is given for explaining the high-voltage cut-through test according to the Subject 758 in the UL Standards. As shown in the figure, to both ends of a wire 13 which is hung down over two parallel drill rods 11, 1/32" in diameter, are applied loads 10 of 1 pound, in a bath kept at the temperature rating, and when 1.5 times as high a rated voltage is applied from the source of direct current 12, breakdown must not take place within 7 hours.

FIG. 3 is provided for the explanation of the fire-resistance test according to the UL Standards. As shown in the figure, when a wire 18, placed perpendicular in an enclosure 14 for the protection from the movement of surrounding air, is exposed to fire from a burner 15, the fire must be extinguished within 60 seconds, and an absorbent cotton 17 placed on the bottom must not be set on fire from dropped burning matter and moreover a sheet of kraft paper 16 placed above must not fire nor be scorched.

In order to satisfy these two requirements, double layered wire comprising inner polyethylene insulation and outer flame retarding resin composition jacket have been employed.

For instance, a wire in which polyethylene with melting point higher than 105° C. is coated over a conductor for passing the high-voltage cut through test has been previously disclosed. According to this disclosure, a flame retarding jacket comprising mainly ethylene-vinylacetate-vinylchloride copolymer is coated over the polyethylene insulation. (See Japanese Patent Publication No. 41786/1977)

It has also been reported that a similar double layered wire outer layer which is comprises polyvinylchloride grafted chlorinated polyethylene (Japanese Patent Publication No. 15058/1979), and chlorosulfonated polyethylene can be employed. (Japanese Patent Laid-Open Publication No. 42755/1974)

These insulated wires achieve VW-1 level flame retardancy by means of covering polyethlene with a highly fire resisting resin composition, which can compensate easy flamability of polyethylene while keeping the excellent insulation property and tracking resistance of polyethylene.

However, these insulated wires have an upper limit of temperature rating of 105° C., because the outer resin composition layer have a PVC moiety or chlorine-containing monomers as a repeating unit.

There are also some examples of single layered high-voltage lead wires in prior art, the insulation of these wires are flame retardant resin like a chlorinated polyethylene. However, these insulated wires also have upper limit of temperature rating of 105° C., so these high-voltage wires cannot be used at higher temperatures.

A method to make a flame retarded polyethylene composition by adding the flame retardant is also known. However, the withstand voltage characteristics of these flame retarded polyethylene composition is inferior, so the high-voltage lead wires with excellent properties have not been obtained by using such a flame retarded polyethylene composition as an insulation.

On the other hand, requirements for the use of high-voltage lead wires have increasingly been severe. The size of electronic appliances have become increasingly smaller and many functions have been required with the result of increased amount of wiring and increased requirement for higher safety and higher heat resistance in wiring materials. To meet such requirements, employment of some highly heat-resistant resins other than polyolefins may be considerable.

Generally the high-voltage lead wires used in an environment at higher than 150° C. are wires with vulcanized silicon rubber.

Silicon rubber insulated high-voltage lead wires have excellent flexibility and electrical properties, however, the silicon rubber insulation is apt to tear by being scraped with metal edges during wiring operations. This sometimes causes cracks in the insulation and leads to dielectrical break-down troubles in the worst case.

Some techniques, for example, covering the silicon rubber insulated wires with braided glass tubing or resin tubing are known. However, in general, silicon rubber insulated wires are expensive, and the total cost becomes much higher when such protecting tubings are adopted. And in addition, the diameter of the protected wire becomes too large and the handling of these insulations in wiring operations become difficult.

High-voltage wires for direct current utilizing such fluorocarbon resins as tetrafluoroethylene and tetrafluoroethylene-hexafluoroethylene copolymer as the insulating materials are also known. They are excellent wires with heat resistance at higher than 150° C., but they are more expensive than silicone-rubber insulated wires and accordingly they are not practical for use other than for a specific purpose.

Thus, the first objective of the present invention is to provide a heat-resistant high-voltage lead wire for direct current with temperature rating of 125° C., which can be manufactured efficiently using inexpensive materials.

The second objective of the present invention is to provide a heat-resistant high-voltage lead wire for direct current with extremely large utility value corresponding to the requirement of higher heat resistant property in the fields of using high-voltage wires for direct current.

SUMMARY OF THE INVENTION

Figure 1A:
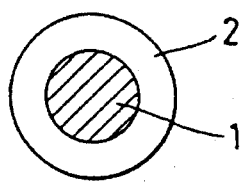
FIGS. 1 (A) and (B) are cross sectional diagrams of embodiments of the high-voltage lead wires for direct current according to the present invention.

The present invention has been completed after extensive studies for over-coming the above described problems by using a polyethylene resin composition as an insulating material with which high-voltage lead wires for direct current having the perpendicular flame resistance (VW-1) in UL Standards and the characteristics passing the requirements for the temperature rating of higher than 125° C. in UL Standards.

The temperature rating of 125° C. here referred to means that the products pass the above-stated high-voltage cut-through test in the UL Standards at the test temperature of 125° C. and also satisfy the following heat aging tests.

In case of the polyethylene insulated wire with temperature rating of 125° C., it is required that the retention of tensile strength be more than 70% and retention of elongation be more than 65% after heat aging test for 7 days at 158° C. and for 60 days at 136° C.

In case of temperature rating of 150° C., it is required that the retention of tensile strength be more than 70% and that the retention of elongation be more than 65% after a heat aging test for 7 days at 180° C. and for 60 days at 158° C.

One example of the embodiment of such polyolefin resin compositions satisfying the above mentioned perpendicular flame resistance (VW-1) and other requirments for temperature rating of 125° C. in UL Standards is a flame retarded polyolefin resin composition which essentially contains (A) resin mixture of polyethylene of which crystalline component has higher than 125° C. of melting point and ethylene-α-olefin copolymer, and (B) a multi-functionalized monomer which has unsaturated carbon-carbon bonds in a molecule.

And the high-voltage lead wire for direct current can be manufactured by extruding the said flame retarded polyolefin resin composition over the conductor followed by ionizing radiation process.

In more detail, the resin mixture (A) comprises polyethylene of which the crystalline component has a melting point of higher than 125° C. and an ethylene-vinylacetate copolymer, an ethylene-methylacrylate copolymer, an ethylene-ethylacrylate copolymer, an ethylene-methylmethacrylate copolymer, ethylene-1-butene copolymer, ethylene-propylene rubber or other ethylene-α-olefin copolymers, and it is preferable that the polyethylene of which crystalline component has a melting point higher than 125° C. occupies more than 40% by weight and less than 80% by weight of the resin mixtures.

To 100 parts of above mentioned resin mixture (A), a single or an admixed multi-functionalized monomer (B) which has the unsaturated carbon-carbon bonds in molecule selected from trimethyrolpropanetrimethacrylate, pentaerythritoltrimethacrylate, triallylisocyanurate, triacrylformal is added preferably in amounts of 1 to 10 parts by weight, as well as flame retardant and inorganic fillers.

The high-voltage lead wire, according to the present invention is obtained by extruding this resin composition over the conductor in single or double layer structure followed by irradiation by means of ionizing radiation.

Figure 1B:
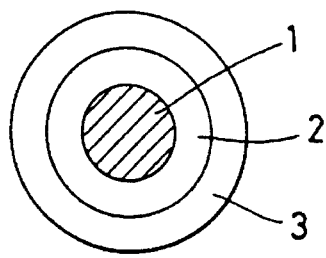
Figure 2:
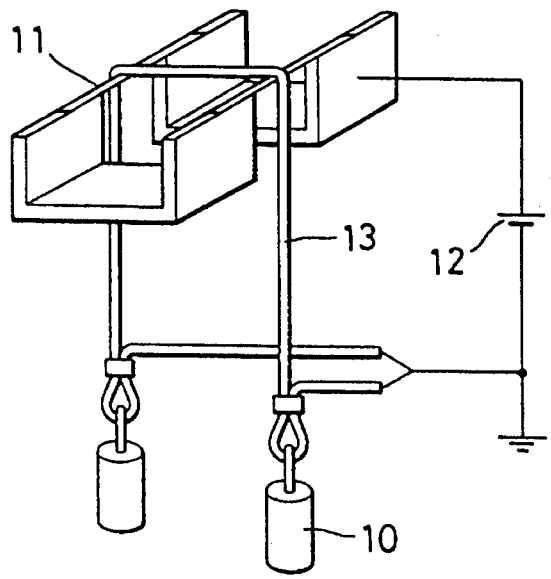
FIG. 2 is a diagram for explaining the high-voltage cut-through test.
Figure 3:
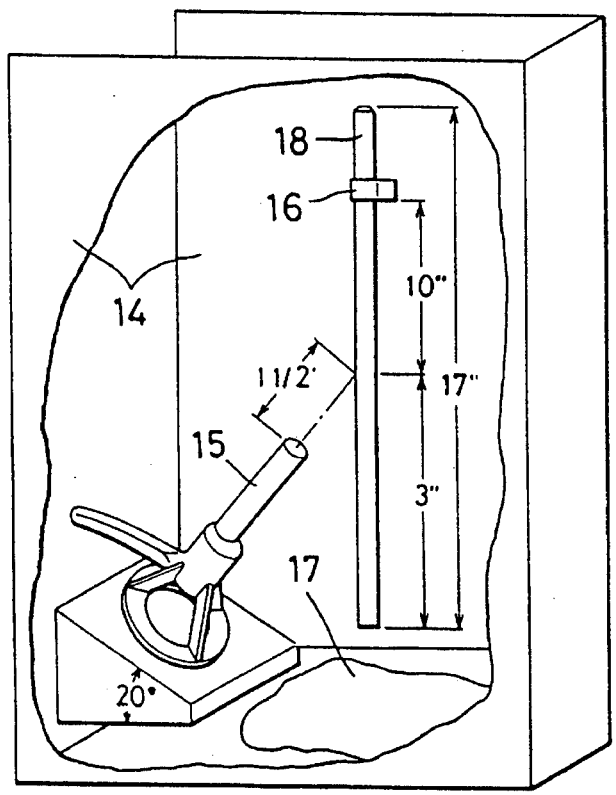
FIG. 3 is a diagram for explaining the VW-1 combustion test.

FIGS. 1 (A) and (B) are cross-sectional views of the high-voltage wires for direct current according to the present invention and 1 stands for the conductor while 2 and 3 for the coating films of the above stated resin composition; 2 and 3 may be of a same composition or of different ones within the range of the above stated compositions.

As examples of the above flame retardant, there may be mentioned such organic halogen compounds as a brominated diphenylether derivatives, a brominated bisphenol derivatives, a brominated epoxy-resin derivative, a brominated phthalimide derivative, perchloropentacyclodecane and trichloroethyl phosphate, and antimony trioxide, borates and molybdenum oxide.

Examples of the inorganic filler are talc, clay, silica and calcium carbonate as well as aluminum hydroxide and magnesium hydroxide.

As the ionizing radiations to be employed, α-rays, β-rays (electron beam), γ-rays, X-rays, ultraviolet rays and others may be mentioned, but in view of the transmitting distance of the radiation, irradiation dose and other aspects of industrial profitability an electron beam is particularly preferable.

Needless to mention, antioxidants, lubricants, coloring pigments, fillers and other additives may be added to the above resin compositions, if desired.

Another example of polyolefin resin compositions to embody the present invention is a resin composition which is the mixture of 100 parts by weight of polyolefin resin and more than 100 parts by weight and less than 200 parts by weight of a metal hydroxide and more than 5 parts by weight and less than 50 parts by weight of a halogen containing flame retardant and 1 parts by weight and less than 10 parts by weight of an organic silane compound represented by general formula below, and the high-voltage lead wire for direct current is produced by extruding the said resin composition over the conductor and irradiating said extruded resin composition layer with an ionizing radiation. The organic composition has the following formula:

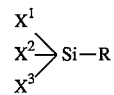

where, R stands for an alkyl group containing acryl or methacryl group and $X^1$, $X^2$ and $X^3$ are atomic groups selected from the group of alkoxy, alkyl and halogen.

As polyolefin resins may be mentioned, in addition to polyethylene, such ethylene-α-olefin copolymers as ethylene-vinylacetate copolymers, ethylene-methyl acrylate copolymers, ethylene-ethylacrylate copolymers, ethylene-methylmethacrylate copolymers, ethylene-1-butene copolymers, ethylene-1-hexene copolymers and ethylene-propylene rubbers, and among them ethylene-vinyl acetate copolymers, ethylene-methylacrylate copolymers and ethylene-ethylacrylate copolymers are particularly preferable from the viewpoint of their flexibility and extrusion performance.

As the halogen-containing flame retardants may be mentioned as examples such a chlorine-containing retardant as perchloropentacyclodecane, such bromine-containing retardants as brominated diphenylether derivatives, brominated bisphenol derivatives, brominated epoxy resin derivatives and brominated phthalimides, and such a phosphorus-containing retardant as brominated phosphates, and it is also possible to augment the flame retarding performance by using, in combination auxiliary flame retardants, such as antimony trioxide, zinc borate and molybdenum oxide.

The halogen-containing flame retardants are desired to be used in the range of 5 to 50 parts by weight in view of the perpendicular flame resistant property (VW-1) of the high-voltage wire for direct current with thicker than 1.0 mm of insulating layer, and when they are used in less than 5 parts by weight flame retarding performance is unsatisfactory while when they are used in more than 50 parts by weight heat aging resistance will be deteriorated.

Examples of the metal hydroxides are aluminum hydroxide, magnesium hydroxide and calcium hydroxide, and of them magnesium hydroxide with the particle size in the range of 0.1 to 3 μm is preferable in view of its extrusion processibility, and the particles with no surface treatment with fatty acid salts, silane coupling agents or other agents are preferable in view of their high-voltage cut-through performance and initial tensile strength.

The preferable amount of metal hydroxide to be added is in the range of 100 to 200 parts by weight in view of the high-voltage cut-through performance, and when it is less than 100 parts by weight the high-voltage cut-through performance is unsatisfactory while when it is more than 200 parts by weight extrusion operation will be undesirably affected.

As the organic silane compounds as shown by the above general formula may be mentioned, for examples, γ-methacryloxypropyltrimethoxysilane, γ-acryloxypropyltrimethoxysilane, γ-methacryloxypropyldimethoxymethylsilane, and γ-methacryloxyethyltrimethoxysilane are preferably to be used, and the organic silane compound is to be added when mixing the molten polyolefin resin, metal hydroxide and halogen-containing flame retardant with compounding machine.

The preferable amount of the organic silane compound to be added is in the range of 1 to 10 parts by weight in view of the balance between the high-voltage cut-through property and initial tensile strength at break where the amount of metal hydroxide is in range of 100 to 200 parts by weight.

When the added amount of organic silane compounds is less than 1 part by weight, the high-voltage cut-through property is insufficient and the initial tensile strength at break is lower than the level of 1.06 kg/mm$^2$ which is required for polyolefin insulated wires in UL Standards, while addition of the organic silane compounds more than 10 parts by weight leads to undesirable effect in the flame retardancy.

Into the above resin compositions may be added, if desired, such inorganic fillers as talc, clay, calcium carbonate, magnesium carbonate and zinc oxide antimony trioxide, zinc borate, antioxidant, coloring pigment, multi-functionalized monomers which accelerate cross-linking, such as trimethylolpropane trimethacrylate, and other additives, and mixing these ingredients by using such a well-known mixing apparatus as a banbury mixer, a pressure kneader, an open-roll mixer and mono- and biaxial mixers.

Coating the conductor with these resin compositions may be performed by using known melt extrudes, and the insulation may be formed over the conductor in single layer or in multiple layers of a same material.

For the cross-linking of the resin compositions, thermal curing may possibly be employed if an organic peroxide is added into the compositions and compressed steam is applied for heating after extruding over the conductor, but in view of the balance between the high-voltage cut-through property and the mechanical properties of insulation layer such as tensile strength and elongation, at break, the curing process with ionized radiation is preferably used.

Cross-linking with irradiation of ionizing radiations may be conducted by using α-rays, electron beam (β-rays), γ-rays, X-rays, ultraviolet rays and others from the sources of ionizing radiations, but in view of such industrial profitabilities as transmitting distance, irradiation dose and time required by irradiation, electron beam is desirable as the source of radiation.

(First Embodiment)

Sample wires were prepared by the procedures described below.

The resin compositions shown in Tables 1 to 3 were applied by the melt extrusion method over annealed copper wire, 0.8 mm φ in outer diameter, to make an insulation layer of 1.21 mm thick, and then irradiated by electron beam at 1 MeV of acceleration voltage to obtain sample wires.

The resin compositions shown in Tables 1 to 3 were formulated in common, other than polyethylene, ethylene-α-olefin copolymer and a monomer containing unsaturated carbon-carbon bond moiety in the molecule, 45 parts by weight of tetrabromobisphenol derivative (containing bromine in 62% by weight; molelcular weight about 8000), 30 parts by weight of powdered antimony trioxide, 15 parts by weight of powdered clay, 5 parts by weight of powdered silica, 3 parts by weight of pentaerithrytyl-tetrakis[3-(3,5-di-t-butyl-4-hydroxyphenyl)propionate], 1 part by weight of distearyl thiodipropionate and 0.5 part by weight of zinc stearate per 100 parts by weight of the resin mixture of polyethylene and ethylene-α-olefin copolymer, and the preparation of the resin compositions were done by using an open-roll mixer heated at 150° C. and after the mixing the compositions were made into pellets and used for melt extrusion.

In Tables 1 to 3 the high-voltage cut-through tests were performed in a gear oven maintained at 125° C. by charging loads of 1 pound each at both ends of the sample wire and applying 30 kV of direct current at n=3. The withstand voltage tests were performed in a gear oven maintained at 125° C. by applying direct current of 25 kV at n=3, after sample wire was submitted to heat aging for 7 days in a gear oven at 158° C. and wound 7 times round a mandrel, 0.5 inch in outer diameter. In the columns for the high-voltage cut-through test and withstand voltage test in Tables 1 to 3 are given the breaking time of the first of the 3 test samples.

In the heat aging tests the residual elongation percentage of sample wires after submitting to heat aging for 7 days in a gear oven at 158° C. was evaluated. Here, the residual elongation percentage=elongation of heat-aged sample wire/ initial elongation×100, and 65% or higher of the residual elongation percentage was evaluated as acceptable. The Combustion tests were carried out by following the VW-1 method at n=5.

TABLE 1

|  | Example 1 | Example 2 | Example 3 | Example 4 | Example 5 | Example 6 |
|---|---|---|---|---|---|---|
| Polyethylene | | | | | | |
| Melting point | 131 | 131 | 129 | 129 | 131 | 131 |
| Melt flow rate | 0.30 | 0.30 | 0.35 | 0.35 | 0.30 | 0.30 |
| Ratio of polyethylene in resin mixture by weight: (Wt %) | 70 | 70 | 50 | 50 | 40 | 40 |
| Ethylene-α-olefin copolymer | Ethylene-vinyl acetate polymer, VA content = 10 wt % | Ethylene-vinyl acetate copolymer VA content = 10 wt % | Ethylene-vinyl acetate copolymer; VA content = 10 wt % | Ethylene-vinyl acetate copolymer; VA content = 10 wt % | Ethylene-ethyl acrylate copolymer; EA content = 9 wt % | Ethylene-ethyl acrylate copolymer; EA content = 9 wt % |
| Melt flow rate | 1.5 | 1.5 | 1.5 | 1.5 | 1.0 | 1.0 |
| Monomer containing unsaturated C—C bond in molecule (phr) | Trimethylolpropane trimethacrylate (3) | Trimethylolpropane trimethacrylate (3) | Triallyl isocyanurate (5) | Triallyl isocyanurate (5) | Triallyl isocyanurate (5) | Triallyl isocyanurate (5) |
| Irradiation dose (Mrad) | 10 | 30 | 10 | 30 | 10 | 30 |
| Holding time in high-voltage cut-through test (Hr) | >8 hr | >8 hr | >8 hr | >8 hr | >8 hr | >8 hr |
| Holding time in withstand voltage test (Hr) | >8 hr | >8 hr | >8 hr | >8 hr | >8 hr | >8 hr |
| Initial tensile strength (kg/mm$^2$) | 1.31 | 1.38 | 1.23 | 1.29 | 1.30 | 1.37 |
| Initial elongation (%) | 115 | 107 | 233 | 186 | 269 | 236 |
| Residual elongation after aging (%) | 76 | 81 | 81 | 93 | 91 | 86 |
| Combustion test (VW-1) | 5/5, passed | 5/5, passed | 5/5, passed | 5/5, passed | 5/5, passed | 5/5, passed |

The melt flow rate of polyethylene: JIS K 6700.
The melt flow rate of ethylene-α-olefin copolymer: JIS K 6730.
Conditions of aging: 158° C., 7 days (gear oven).
Conditions of aging for the withstand voltage test: 158° C., for 7 days (gear over).
Those samples that did not break after 8 hours in the high-voltage cut-through test and in the withstand voltage test we indicated as >8 Hr.

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Polyethylene | | | | | | |
| Melting point | 131 | 131 | 131 | 131 | 129 | 120 |
| Melt flow rate | 0.30 | 0.30 | 0.30 | 0.30 | 0.35 | 0.35 |
| Ratio of polyethylene in resin mixture by weight (Wt %) | 100 | 100 | 70 | 70 | 50 | 50 |
| Ethylene-α-olefin copolymer | — | — | Ethylene-vinyl acetate copolymer; VA content = 10 wt % | Ethylene-vinyl acetate copolymer; VA content = 10 wt % | Ethylene-vinyl acetate copolymer; VA content = 10 wt % | Ethylene-vinyl acetate copolymer; VA content = 10 wt % |
| Melt flow rate | | | 1.5 | 1.5 | 1.5 | 1.5 |
| Monomer containing unsaturated C—C bond in molecule (phr) | — | Trimethylolpropane trimethacrytate (3) | — | — | — | — |
| Irradiation dose (Mrad) | 10 | 30 | 10 | 30 | 10 | 30 |
| Holding time in high-voltage cut-through test (Hr) | 25 min | >8 hr | 7 min | 10 min | 0 min | 3 min |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| Holding time in withstand voltage test (Hr) | 4.7 hr | >8 hr | 4.8 hr | 3.2 hr | 5.6 hr | 4.4 hr |
| Initial tensile strength (kg/mm$^2$) | 0.76 | 1.42 | 0.92 | 1.04 | 1.06 | 1.11 |
| Initial elongation (%) | 3 | 6 | 116 | 76 | 264 | 243 |
| Residual elongation after aging (%) | — | — | 78 | — | 74 | 56 |
| Combustion test (VW-1) | 5/5, passed | 5/5, passed | 5/5, passed | 5/5, passed | 5/5, passed | 5/5, passed |

The melt flow rate of polyethylene: JIS K 6700.
The melt flow rate of ethylene-α-olefin copolymer: JIS K 6730.
Conditions of aging: 158° C., 7 days (gear oven).
Conditions of aging for the withstand voltage test: 158° C., for 7 days (gear over).
Those samples that did not break after 8 hours in the high-voltage cut-through test and in the withstand voltage test we indicated as >8 Hr.

TABLE 3

|  | Comparative Example 7 | Comparative Example 8 | Comparative Example 9 | Comparative Example 10 | Comparative Example 11 | Comparative Example 12 |
|---|---|---|---|---|---|---|
| Polyethylene |  |  |  |  |  |  |
| Melting point | 131 | 131 | 131 | 131 | 131 | 131 |
| Melt flow rate | 0.30 | 0.30 | 0.30 | 0.30 | 0.30 | 0.30 |
| Ratio of polyethylene in resin mixture by weight (Wt %) | 40 | 40 | 30 | 30 | 70 | 70 |
| Ethylene-α-olefin copolymer | Ethylene-ethyl acrylate copolymer; EA-content = 9 wt % | Ethylene-ethyl acrylate copolymer; EA content = 9 wt % | Ethylene-vinyl acetate copolymer; VA content = 10 wt % | Ethylene-vinyl acetate copolymer; VA content = 10 wt% | Ethylene-vinyl acetate copolymer; VA content = 10 wt % | Ethylene-vinyl acetate copolymer; VA content = 10 wt % |
| Melt flow rate | 1.0 | 1.0 | 1.5 | 1.5 | 1.0 | 1.0 |
| Monomer containing unsaturated C—C bond in molecule (phr) | — | — | Trimethylolpropane trimethacrylate (5) | Trimethylolpropane trimethacrylate (5) | 1,6-Hexanediol dimethacrylate (5) | 1,6-Hexanediol dimethacrylate (5) |
| Irradiation dose (Mrad) | 10 | 30 | 10 | 30 | 10 | 30 |
| Holding time in high-voltage cut-through test (Hr) | 0 min | 0 min | 45 min | 1.4 hr | 3.2 hr | >8 hr |
| Holding time in withstand voltage test (Hr) | 5.7 hr | 4.3 hr | >8 hr | >8 hr | >8 hr | >8 hr |
| Initial tensile strength (kg/mm$^2$) | 1.02 | 1.17 | 1.29 | 1.33 | 1.12 | 1.17 |
| Initial elongation (%) | 316 | 305 | 231 | 172 | 232 | 193 |
| Residual elongation after aging (%) | 68 | 47 | 78 | 81 | 73 | 79 |
| Combustion test (VW-1) | 2/5, passed | 5/5, passed | 5/5, passed | 5/5, passed | 3/5, passed | 5/5, passed |

The melt flow rate of polyethylene: JIS K 6700.
The melt flow rate of ethylene-α-olefin copolymer: JIS K 6730.
Conditions of aging: 158° C., 7 days (gear oven).
Conditions of aging for the withstand voltage test: 158° C., for 7 days (gear over).
Those samples that did not break after 8 hours in the high-voltage cut-through test and in the withstand voltage test we indicated as >8 Hr.

The results on the characteristics of the high-voltage cut-through test, withstand voltage test, heat aging test and combustion test for the different resin compositions of the sample wire are as follows.

For the high-voltage cut-through test such resin compositions as Examples 1 to 6 and Comparative Example 12 which contained polyethylene with higher than 125° C. of melting point and ethylene-α-olefin copolymer in the ratio of more than 40/60 by weight and also contained a monomer having unsaturated carbon-carbon bond moiety in the molecule passed the test at 125° C.

On the other hand, such a composition as Comparative Example 2 of which base resin was comprising solely of polyethylene with a melting point higher than 125° C. passed the high-voltage cut-through test however, it showed markedly lowered initial elongation.

As for the withstand voltage test such compositions as Comparative Examples 1, 3, 4, 5, 6, 7 and 8 which did not contain a monomer having unsaturated carbon-carbon bond moiety in the molecule caused dielectric break-down before reaching 7 hours of testing time. By contrast such sample wires as Examples 1 through 6 and Comparative Examples 2, 9, 10, 11 and 12 containing the monomer having unsaturated carbon-carbon bond moiety in the molecule showed longer than 8 hours of the withstand voltage characteristics.

As for the results of the heat aging resistance test and the combustion test of VW-1, it was found that such compositions as Examples 1 through 6 and Comparative Examples 11 and 12 which contained a monomer having unsaturated carbon-carbon bond moiety in the molecule showed higher than acceptable 65% of residual elongation percentage after heat aging and also passed the VW-1.

By contrast such compositions as Comparative Examples 5, 6, 7 and 8 which did not contain a monomer having unsaturated carbon-carbon bond moiety in the molecule gave undesirably lower than 65% of the residual elongation percentage after heat aging; the compositions of Comparative Examples 6 and 8 which were irradiated 30 Mrad dose of electron beam passed the VW-1 test however, these samples did not passed the heat aging test. On the other hand, Comparative Examples 5 and 7 which were irradiated 10 Mrad dose of electron beam showed higher than 65% of the residual elongation percentage after heat aging test however, some samples could not pass the VW-1 test.

As obvious from the above discussion, in view of the balance of all of the characteristics of high-voltage cut-through, withstand voltage, VW-1 combustion test and heat aging resistance, it is concluded that such resin compositions are preferable, which contain polyethylene with a melting point of higher than 125° C. and ethylene-α-olefin copolymer in a compositional ratio higher than 40/60 of more preferably in the range of 40/60 to 80/20, and which contains a monomer having unsaturated carbon-carbon bond moiety in the molecule. It is mentioned further on the monomer having unsaturated carbon-carbon bond moiety in the molecule that such so-called trifunctional monomers as trimethylolpropanetrimethacrylate, pentaerythritoltrimethacrylate, triallyl isocyanurate and triallylcyanurate are preferably contained into the resin compositions for efficient production of high-voltage lead wire for direct current by using relatively low doses of irradiation.

(Second Embodiment)

Sample wires were prepared as follows: The resin compositions shown in Tables 4 to 6 were kneaded together with polyolefin resin, fillers, organic silane compound, anti-oxidant and other additives which were added at a same time by using an open-roll mixer heated at 130° C. and the mixture was made into pellets. The pellets were used to be extruded over annealed copper wire, 0.8 mm in diameter by using a melt extruder to obtain insulated wires with diameters of 2.27 mm and 4.23 mm, which were irradiated by electron beam at 2 MV of acceleration voltage to prepare the sample wires.

TABLE 4

| | Example 7 | Example 8 | Example 9 | Example 10 | Example 11 | Example 12 | Example 13 |
|---|---|---|---|---|---|---|---|
| Polyolefin resin 100 phr | | | | | | | |
| Base resin | EVA | EEA | EVA | EMA | EEA | EVA | Ethylene-1-butene copolymer/EEA = 50/50 (by wt) |
| Melt flow rate | 1 | 0–5 | 1 | 1 | 0.5 | 1 | 2.5 |
| Note | VA content 25% | EA content 19% | VA content 33% | MA content 20% | EA content 19% | VA content 25% | EEA:EA content 19% |
| Halogen-type flame retardant | Brominated phthalimide derivative (Br content 61%) 30 phr | Decabromodiphenylether 20 phr | Perchloropentacyclodecane 15 phr | Decabromodiphenylether 10 phr | Perchloropentacyclodecane 10 phr | Tris(tribromoneopentyl)phosphate 20 phr | Decabromodiphenylether 30 phr |
| Magnesium hydroxide (phr) | 120 | 140 | 160 | 140 | 180 | 150 | 150 |
| γ-Methacryloxypropyltrimethoxysilane (phr) | 4 | 3 | 2 | 4 | 1 | 3 | 4 |
| Irradiation dose (Mrad) | 20 | 15 | 25 | 20 | 15 | 20 | 20 |
| High-voltage cut-through holding time (2.27 ø) | Passed | Passed | Passed | Passed | Passed | Passed | Passed |
| High-voltage cut-through holding time (4.23 ø) | Passed | Passed | Passed | Passed | Passed | Passed | Passed |
| Initial (2.27 ø) | | | | | | | |
| Tensile strength (kg/mm²) | 1.13 | 1.26 | 1.16 | 1.32 | 1.16 | 1.26 | 1.21 |
| Elongation (%) | 226 | 181 | 169 | 213 | 166 | 173 | 152 |
| Young's modulus (kg/mm²) | 4.78 | 5.23 | 3.96 | 5.54 | 6.87 | 5.22 | 4.36 |
| After aging (A) (2.27 ø) | | | | | | | |
| Residual tensile | 95 | 112 | 105 | 82 | 101 | 78 | 85 |

TABLE 4-continued

|  | Example 7 | Example 8 | Example 9 | Example 10 | Example 11 | Example 12 | Example 13 |
|---|---|---|---|---|---|---|---|
| strength (%) |  |  |  |  |  |  |  |
| Residual elongation rate (%) | 92 | 87 | 81 | 90 | 78 | 73 | 82 |
| After aging (B) (2.27 ø) |  |  |  |  |  |  |  |
| Residual tensile strength (%) | 105 | 132 | 98 | 126 | 92 | 80 | 101 |
| Residual elongation rate (%) | 87 | 83 | 78 | 93 | 82 | 68 | 94 |
| VW-1 combustion test (2.27 ø) | 5/5, passed | 5/5, passed | 5/5, passed | 5/5, passed | 5/5, passed | 5/5, passed | 5/5, passed |
| VW-1 combustion test (4.23 ø) | 5/5, passed | 5/5, passed | 5/5, passed | 5/5, passed | 5/5, passed | 5/5, passed | 5/5, passed |
| Extruded appearance | Good | Good | Good | Good | Good | Good | Good |

Melt flow rate: 190° C., 2160 g load (g/10 minutes) EVA: Ethylenevinyl acetate copolymer
Conditions of aging A: 158° C., 7 days (gear oven) EEA: Ethyleneethylacryalte copolymer
Conditions of aging B: 136° C., 60 days (gear oven) EMA: Ethylenemethylacrylate copolymer

TABLE 5

|  | Comparative Example 13 | Comparative Example 14 | Comparative Example 15 | Comparative Example 16 | Comparative Example 17 | Comparative Example 18 | Comparative Example 19 |
|---|---|---|---|---|---|---|---|
| Polyolefin resin 100 phr |  |  |  |  |  |  |  |
| Base resin | EVA | EEA | EVA | EVA | EVA | EVA | EVA |
| Melt flow rate | 1 | 0.5 | 1 | 1 | 1 | 1 |  |
| Note | VA content 25% | EA content 19% | VA content 25% | VA content 25% | VA content 25% | VA content 25% | VA content 25% |
| Halogen containing type flame retardant | Decabromodiphenylether 20 phr | Decabromodiphenylether 20 phr | Perchloropentacyclodecane 20 phr | Perchloropentacyclodecane 20 phr | Perchloropentacyclodecane 20 phr | Brominated phthalimide derivative (Br content 61%) 10 phr | Decabromodiphenylether 20 phr |
| Magnesium hydroxide (phr) | 200 | 200 |  |  |  | 200 | 200 |
| Magnesium hydroxide (oleate-treated) (phr) |  |  | 140 |  |  |  |  |
| Magnesium hydroxide (vinyl silane-treated) (phr) |  |  |  | 180 |  |  |  |
| Magnesium hydroxide (γ-methacryloxypropyl trimethoxysilane-treated) (phr) |  |  |  |  | 160 |  |  |
| γ-Methacryloxypropyl trimethoxysilane (phr) | 5 |  |  | 5 | 5 |  |  |
| Vinyl triethoxysilane (phr) |  |  |  |  |  | 5 |  |
| Trimethylolpropane trimethacrylate (phr) |  |  |  |  |  |  | 5 |
| Irradiation dose (Mrad) | No | 30 | 30 | 30 | 30 | 30 | 30 |
| High-voltage cut-through holding time (2.27 ø) | <0.1 hr | <0.1 hr | 0.5 hr | <0.1 hr | <0.1 hr | <0.1 hr | 0.2 hr |
| High-voltage cut-through holding time (4.23 ø) | <0.1 hr | <0.1 hr | 0.3 hr | <0.1 hr | 0.4 hr | <0.1 hr | 0.5 hr |
| Initial (2.27 ø) |  |  |  |  |  |  |  |
| Tensile strength (kg/mm²) | 0.62 | 0.68 | 0.58 | 0.61 | 0.79 | 0.81 | 0.88 |
| Elongation (%) | 409 | 337 | 403 | 625 | 247 | 278 | 167 |
| Young's modulus (kg/mm²) | 4.12 | 5.60 | 3.89 | 4.04 | 4.85 | 4.66 | 6.82 |
| After aging (A) (2.27 ø) |  |  |  |  |  |  |  |
| Residual tensile strength (%) | Failed to hold shape | 139 | 85 | 132 | 129 | 106 | 93 |
| Residual elongation rate (%) |  | 38 | 22 | 19 | 52 | 41 | 44 |
| After aging (B) |  |  |  |  |  |  |  |

TABLE 5-continued

|  | Comparative Example 13 | Comparative Example 14 | Comparative Example 15 | Comparative Example 16 | Comparative Example 17 | Comparative Example 18 | Comparative Example 19 |
|---|---|---|---|---|---|---|---|
| (2.27 ø) |  |  |  |  |  |  |  |
| Residual tensile strength | Failed to hold shape | 101 | 122 | 115 | 86 | 122 |  |
| Residual elongation rate |  | 46 | 39 | 22 | 47 | 43 |  |
| VW-1 combustion test (2.27 ø) | 2/5, passed | 5/5, passed | 5/5, passed | 5/5, passed | 5/5, passed | 5/5, passed |  |
| VW-1 combustion test (4.23 ø) | 4/5, failed | 5/5, passed | 5/5, passed | 5/5, passed | 5/5, passed | 5/5, passed |  |
| Extruded appearance | Good | Good | Good | Good | Good | Good |  |

Melt flow rate: 190° C., 2160 g load (g/10 minutes)
Conditions of aging A: 158° C., 7 days (gear oven)
Conditions of aging B: 136° C., 60 days (gear oven)

TABLE 6

|  | Comparative Example 20 | Comparative Example 21 | Comparative Example 22 | Comparative Example 23 | Comparative Example 24 | Comparative Example 25 | Comparative Example 26 |
|---|---|---|---|---|---|---|---|
| Polyolefin resin 100 phr |  |  |  |  |  |  |  |
| Base resin | EVA | EVA | EVA | EVA | EVA | EVA | EVA |
| Melt flow rate | 1 | 1 | 1 | 1 | 1 | 1 | 1 |
| Note | VA content 25% | VA content 25% | VA content 25% | VA content 25% | VA content 25% | VA content 25% | VA content 25% |
| Halogen-type flame retardant | Decabomodiphenylether 20 phr | Decabromodiphenylether 20 phr |  |  |  | Decabomodiphenylether 20 phr | Decabromodiphenylether 20 phr |
| Flame retardant other than of halogen containig type (phr) |  |  |  | Tributyl phosphate 30 phr | Ammonium polyphosphate 30 phr |  |  |
| Magnesium hydroxide (phr) | 80 | 240 | 180 | 180 | 180 | 160 | 160 |
| γ-Methacryloxypropyl trimethoxysilane (phr) | 6 | 2 | 2 | 3 | 3 | 3 | 3 |
| Dicumyl peroxide (phr) |  |  |  |  |  | 2 | 2 |
| Irradiation dose (Mrad) | 30 | 10 | 20 | 20 | 20 | Steam cured for 5 min | Steam cured for 5 min |
| High-voltage cut-through holding time (2.27 ø) | 2.5 hr | Passed | Passed | 5.5 hr | 3.0 hr | 3.5 hr | Passed |
| High-voltage cut-through holding time (4.23 ø) | 4.5 hr | Passed | Passed | Passed | 5.5 hr | 4.5 hr | Passed |
| Initial (2.27 ø) |  |  |  |  |  |  |  |
| Tensile strength (kg/mm$^2$) | 1.38 | 1.33 | 1.20 | 1.08 | 0.94 | 1.18 | 1.26 |
| Elongation (%) | 295 | 53 | 216 | 222 | 139 | 164 | 86 |
| Young's modulus (kg/mm$^2$) | 4.20 | 7.22 | 4.86 | 5.01 | 5.63 | 5.33 | 5.02 |
| After aging (A) (2.27 ø) |  |  |  |  |  |  |  |
| Residual tensile strength (%) | 88 | — | 108 | 68 | 88 | 94 | — |
| Residual elongation rate (%) | 96 | — | 93 | 47 | 56 | 53 | — |
| After aging (B) (2.27 ø |  |  |  |  |  |  |  |
| Residual tensile strength (%) | 105 | — | 95 | 17 | Estimation impossble | 124 | — |
| Residual elongation rate (%) | 67 | — | 82 | 3 | Estimation impossible | 78 | — |
| VW-1 combustion test (2.27 ø) | 5/5, passed | 5/5, passed | 5/5, passed | 1/5, failed | 1/5, failed | 5/5, passed | 5/5, passed |
| VW-1 combustion test (4.23 ø) | 5/5, passed | 5/5, passed | 3/5, failed | 2/5, failed | 3/5, failed | 5/5, passed | 5/5, passed |
| Extruded appearance | Good | Slightly No- | Good | Good | Good | Good | Good |

TABLE 6-continued

|  | Comparative Example 20 | Comparative Example 21 | Comparative Example 22 | Comparative Example 23 | Comparative Example 24 | Comparative Example 25 | Comparative Example 26 |
|---|---|---|---|---|---|---|---|
|  | Good |  |  |  |  |  |  |

Melt flow rate: 190° C., 2160 g load (g/10 minutes)
Conditions of aging A: 158° C., 7 days (gear oven)
Conditions of aging B: 136°C., 60 days (gear oven)

To the resin compositions described in Tables 4 to 6 were formulated, in addition to the shown ingredients, 10 parts by weight of antimony trioxide, 3 parts by weight of pentaerythrityltetrakis[3-(3,5-di-t-butyl-4-hydroxyphenyl)propionate], 1 part by weight of distearyl thiodipropionate and 0.5 part by weight of zinc stearate in common, against 100 parts by weight of the polyolefin resin.

The high-voltage cut-through test in Tables 4 to 6 was performed by charging 1 pound load at each of both ends of sample wire in a gear oven maintained at 125° C. and the dielectric breakdown time was measured by applying 15 kV of direct current to the samples of 2.27 mm $\phi$ and 60 kV to those of 4.23 mm $\phi$ at n=3 respectively, and when 3 samples stood unbroken for longer than 8 hours the example was judged as passed.

In the heat aging test with the sample wires with 2.27 mm $\phi$ diameter, the retention of tensile strength and of elongation of the samples which had been submitted to aging by heating for 7 days at 158° C. and those aged for 60 days at 136° C. were measured.

Here, retention (%)=(Value of heat-aged sample/Initial value)×100, and samples were judged as passed when they showed higher than 70% of the retention of tensile strength and higher than 65% of that of elongation. The combustion test was carried out following the VW-1 method at n=5.

The characteristics of the resin coatings in the high-voltage cut-through test, heat aging test, combustion test and other tests in reference to their composition are as follows.

In Examples 7 through 13 such resin compositions as containing magnesium hydroxide with no surface treatment in the range of 100 to 200 parts by weight, halogen containing type flame retardant in the range of 5 to 50 parts by weight and an organic silane compound as represented by the general formula [1] in the range of 1 to 10 parts by weight, against 100 parts by weight of the olefin resin, were extruded over the conductor and cross-linked by electron bean irradiation. These samples passed the high-voltage cut-through test and both of the 2.27 mm $\phi$ and 4.23 mm $\phi$ samples passed the combustion test. They showed the initial tensile strength in the range of 1.1 to 1.3 kg/mm², satisfied the tensile strength higher than 1.06 kg/mm² required in the UL Standards and passed both heat aging tests at 158° C. for 7 days and at 136° C. for 60 days. These samples showed about 3 to 6 kg/mm² of the Young's modulus in the insulating layer demonstrating that they were materials with excellent flexibility.

In Comparative Example 13 the sample contained 200 parts by weight of magnesium hydroxide without surface-treatment, 20 parts by weight of halogen containing type flame retardant and 5 parts by weight of an organic silane compound represented by the general formula [1] and was not irradiated by electron beam for cross linking. This sample failed to pass the high-voltage cut-through test and did not reach the level of 1.06 kg/mm² required in the UL Standards for the initial tensile strength.

In Comparative Example 14, a resin compound without being added with the organic silane compound represented by the general formula [1] was used for insulating layer. The sample failed to pass the high-voltage cut-through test.

In Comparative Example 15, magnesium hydroxide of which surface had previously been treated with oleate was used. The sample passed the VW-1 test however, it showed the tensile strength lower than 1.06 kg/mm² and did not pass the high-voltage cut-through test, heat-aging test.

The sample in Comparative Example 16 used magnesium hydroxide previously surface-treated with vinylsilane passed the VW-1 test however, it showed the tensile strength lower than 1.06 kg/mm² and failed to pass the high-voltage cut-through test, heat-aging test.

In Comparative Example 17, magnesium hydroxide which had previously been surface-treated with γ-methacryloxypropyl-trimethoxysilane was used. The sample passed the combustion test but the initial tensile strength was lower than 1.06 kg/mm², and it failed to pass the high-voltage cut-through test and showed lower than 65% of the residual elongation percentage after the heat aging test.

In Comparative Example 18, vinyltriethoxysilane was employed in place of an organic silane compound represented by the general formula. The sample did not pass the high-voltage cut-through test and did not satisfy the required level of 1.06 kg/mm² of the initial tensile strength.

In Comparative Example 19, a polyfunctionalized monomer of trimethylolpropanetrimethacrylate, which had been widely used as a cross-linking accelerator for polyolefin and other thermoplastic resins, was added to accelerate the cross-linking efficiency by electron beam irradiation, but the sample failed to pass the high-voltage cut-through test and the 4.23 mm $\phi$ sample did not pass the combustion test.

The sample in Comparative Example 20 contained 80 parts by weight of magnesium hydroxide, of which the surface had not been treated, failed to pass the high-voltage cut-through test.

The sample in Comparative Example 21 contained 240 parts by weight of magnesium hydroxide. It passed the high-voltage cut-through test however, it is questionable in practical use because it had slightly unsatisfactory appearance after extrusion and lower than 100% of initial elongation.

In Comparative Example 22 no halogen containing type flame retardant was added to the sample. It passed the high-voltage cut-through test but in the VW-1 test, the sample of 2.27 mm $\phi$ passed it while the one of 4.23 mm $\phi$ failed.

In the samples of Comparative Examples 23 and 24, a halogen containing type flame retardant was not used but tributyl phosphate and ammonium polyphosphate, phosphorus-type retardants, were used instead. In comparison with Comparative Example 22, the replacements were found to lower the flame resistance and also exert undesirable effects on the high-voltage cut-through characteristics.

In Comparative Examples 25 and 26, 2 parts by weight of dicumyl peroxide were added per 100 parts by weight of the polyolefin resin to make a thermally curable resin compositions and they were extruded over the conductor and heat-cured by compressed steam. The sample of Comparative Example 26 satisfied the high-voltage cut-through characteristics however, it showed undesirably lower than 100% of initial elongation, while the sample of Comparative Example 25 satisfied the initial elongation characteristics but failed to pass the high-voltage cut-through and heat aging resistance test, showing unbalance among characteristics.

Thus, a high-voltage lead wire for direct current is provided herein which passes the required high-voltage cut-through property and flame resistance (VW-1), has a temperature rating grade higher than 125° C. and possesses excellent flexibility. This is obtained by extruding over a conductor a resin composition prepared by adding more than 100 parts by weight and less than 200 parts by weight of magnesium hydroxide with no surface treatment, more than 5 parts by weight but less than 50 parts by weight of a halogen containing type flame retardant and more than 1 part by weight and less than 10 parts by weight of an organic silane compound.

As explained above, according to the present invention, a high-voltage lead wire for direct current, a which satisfies a temperature rating of 125° C., can be efficiently manufactured, using inexpensive materials. This wire should meet the demands of heat resistance in the field of high-voltage wires for direct current and is expected to have an extremely valuable utility.

What is claimed is:

1. An insulated high-voltage lead wire for direct current in which an insulating layer is formed over the conductor, said insulating layer comprising a polyolefin based resin composition, said polyolefin resin composition being a flame-retardant resin composition comprising a resin mixture (A) of 40 to 80% by weight a polyethylene, of which a crystalline component of the polyethylene has a melting point between about 125° C. to 131° C., and an ethylene-α-olefin copolymer, and a multi-functionalized monomer (B) having an unsaturated carbon-carbon bond moiety in its molecule as an indispensable component and wherein said insulating layer is irradiated by ionizing radiation.

2. An insulated, high-voltage lead wire for direct current as claimed in claim 1, wherein the monomer (B) having an unsaturated carbon-carbon bond moiety in its molecule, is a compound or a mixture of 2 or more compounds selected from the group consisting of trimethylolpropane trimethacrylate, pentaerythritol trimethacrylate, triallyl isocyanurate, triallyl cyanurate and triacrylformal.

3. An insulated high voltage wire for direct current as claimed in claim 1 in which the crystalline component of the polyethylene resin has a melting point of between 129° C. and 131° C.

* * * * *